US009020464B2

(12) United States Patent
Mathison

(10) Patent No.: US 9,020,464 B2
(45) Date of Patent: Apr. 28, 2015

(54) COUNTER-BASED LIMITATION OF SUBSCRIBER CHARGING INACCURACY

(71) Applicant: Cellco Partnership Verizon Wireless, Basking Ridge, NJ (US)

(72) Inventor: James Mathison, Warren, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 126 days.

(21) Appl. No.: 13/723,041

(22) Filed: Dec. 20, 2012

(65) Prior Publication Data

US 2014/0179264 A1  Jun. 26, 2014

(51) Int. Cl.
*H04M 11/00* (2006.01)
*H04M 15/00* (2006.01)
*H04W 4/24* (2009.01)

(52) U.S. Cl.
CPC .............. *H04M 15/60* (2013.01); *H04M 15/70* (2013.01); *H04M 15/73* (2013.01); *H04M 15/82* (2013.01); *H04W 4/24* (2013.01); *H04M 2215/14* (2013.01); *H04M 2215/146* (2013.01); *H04M 2215/22* (2013.01)

(58) Field of Classification Search
CPC ..... H04W 28/02; H04W 72/12; H04W 80/02; H04W 74/00
USPC ................ 455/405–409; 379/100.03, 100.04, 379/100.07, 112.01, 114.01, 114.03, 379/114.08, 114.05, 100.05, 112.07; 370/428
See application file for complete search history.

(56) References Cited

U.S. PATENT DOCUMENTS

| | | | |
|---|---|---|---|
| 6,853,630 B1 * | 2/2005 | Manning | 370/338 |
| 6,999,449 B2 * | 2/2006 | Barna et al. | 370/352 |
| 7,366,136 B1 | 4/2008 | Kalbag et al. | |
| 8,112,062 B2 | 2/2012 | Pattabiraman | |
| 2003/0061160 A1 * | 3/2003 | Asahina | 705/40 |
| 2003/0232615 A1 * | 12/2003 | Kim et al. | 455/405 |
| 2012/0176972 A1 * | 7/2012 | Mangal | 370/328 |

* cited by examiner

*Primary Examiner* — Ajit Patel
*Assistant Examiner* — Said Elnoubi

(57) ABSTRACT

Disclosed techniques limit or reduce the amount of data for which a subscriber may be charged that may not actually be received at the subscriber's mobile device. A counter may be started when a node has data to be delivered to a mobile device. The node may send the data through a radio access network for delivery to the mobile device and record an amount of the data sent for the mobile device through the radio access network for data usage billing purposes while running the counter, until the counter reaches a predetermined value. When the counter reaches the predetermined value, if no traffic channel has been set up with the mobile device, the node will stop recording the amount of the data sent for the mobile device through the radio access network for data usage billing purposes.

20 Claims, 7 Drawing Sheets

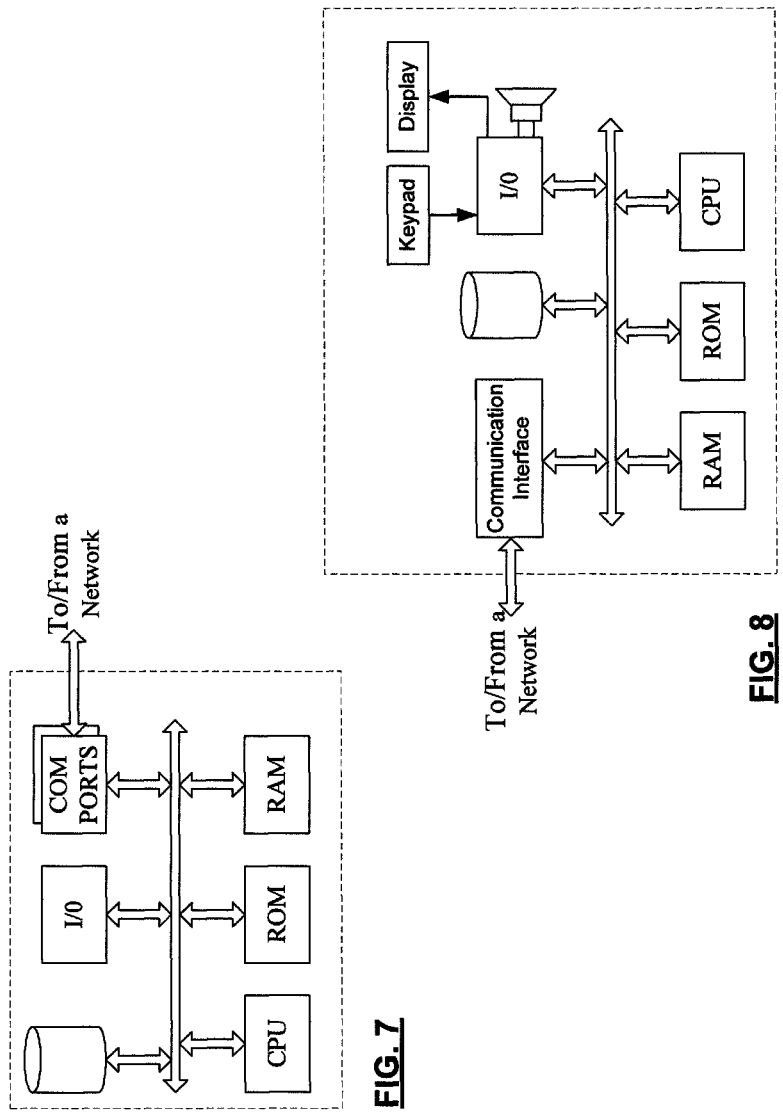

COUNTER-BASED LIMITATION OF SUBSCRIBER CHARGING INACCURACY

BACKGROUND

In recent years, mobile communication services have expanded and increased in popularity around the world. Many operators of modern mobile communication networks offer their users or subscribers advanced data communication services (e.g., for Internet access, or third party email or content access), in addition to standard wireless mobile communication services such as for voice calls or mobile messaging services (e.g., text and/or multimedia).

With the increased sophistication of mobile networks and the increased consumer usage of mobile wireless data services, the recent trend is for the network service providers to replace unlimited data plans with service plans in which the cost to the customer is based on usage, e.g. the amount of data communication transported through the network to/from a mobile device.

In some cases, a customer may enter into an agreement with a service provider and/or a network operator to obtain communication services through a mobile network for a customer's device in exchange for fees based on the amount of the service used. In the case of data transport services, a customer may be billed according to the amount of data sent by and received from the customer's device.

However, in some cases, the data sent to the customer's device and charged to the customer may not have been received by the customer's device for some reason. For example, there may be a delivery failure in the network after the data was recorded for charging to the customer or the customer's device may not be reachable by a mobile communication network. Hence a need exists for reducing the amount that customers are charged for data that they do not actually receive.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a block diagram illustrating a network or host computer.

FIG. 8 is a block diagram illustrating a computer with user interface elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples described herein relate to decreasing the discrepancy between the amount of data charged to a subscriber and the amount of data actually received by the subscriber's mobile device via a mobile communication network. In order to transmit or receive data via the mobile communication network, an active traffic channel is established between the mobile device and the mobile communication network. The data may then be transmitted to and from the mobile device using the active traffic channel. The traffic channel will remain active while data is being transmitted between the mobile device and the mobile communication network. However, after an idle period when data ceases to flow between the mobile device and the mobile communication network, the traffic channel will be surrendered. As will be discussed in further detail below, a system may be configured to bound or limit the amount of data for which a subscriber is charged but may not actually receive by using a counter and determining whether or not an active traffic channel is set up for the subscriber's mobile device before a limit associated with the counter value reaches or exceeds a limit.

Figure 1:
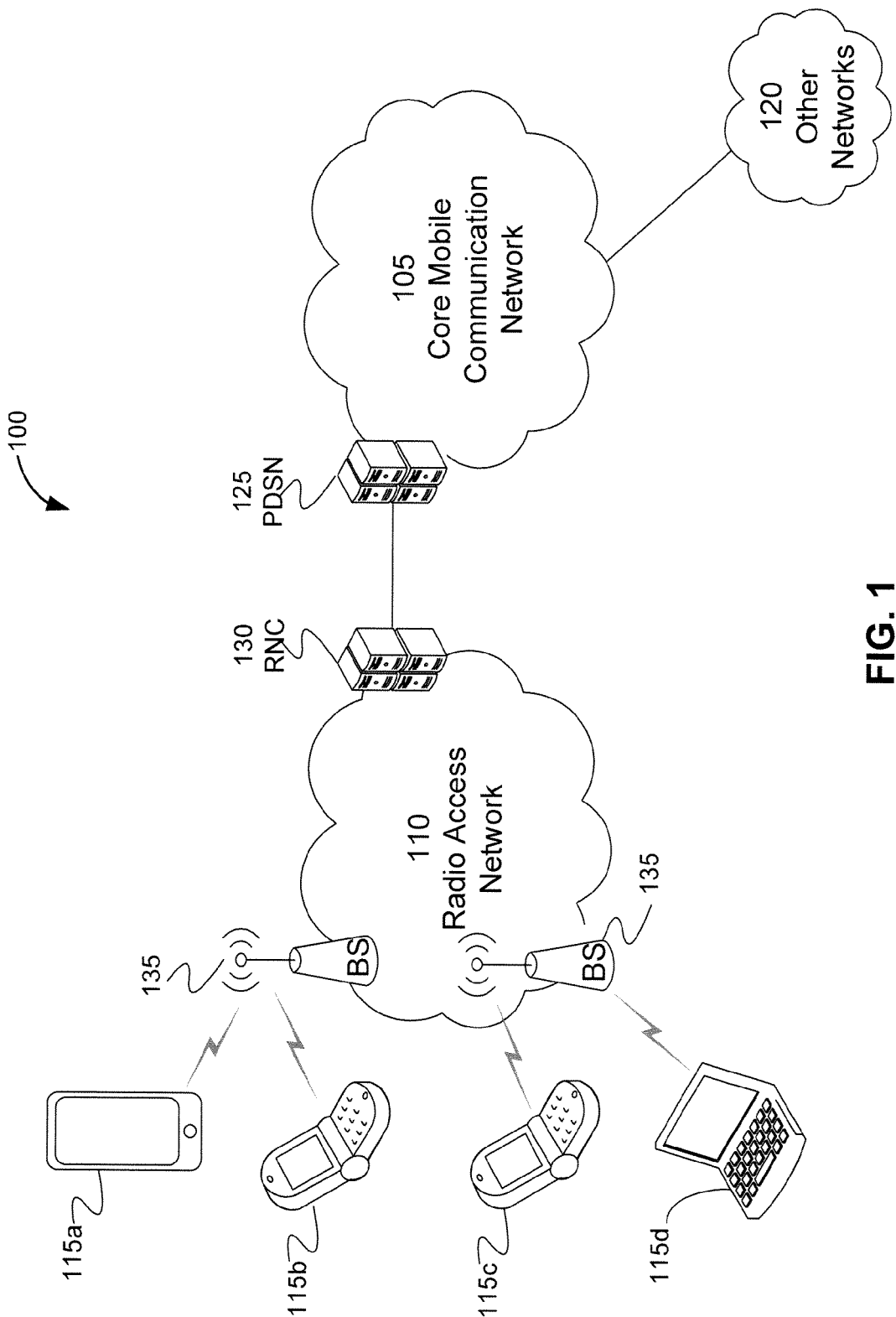
FIG. 1 is a simplified functional diagram that illustrates an exemplary network environment that may be configured to limit the amount of data that is processed for charging to a subscriber that may not be actually received by the subscriber's mobile device.

Reference now is made in detail to the examples illustrated in the accompanying drawings and discussed below. FIG. 1 is a simplified functional diagram that illustrates an exemplary network environment 100 that may be configured to limit the amount of data that is charged to a subscriber that may not be actually received by the subscriber's mobile device. The network environment 100 in FIG. 1 includes a core mobile communication network 105, one or more radio access networks 110, and one or more mobile devices 115a to 115d. Only a small number of mobile devices are illustrated for convenience. Although FIG. 1 only shows one network environment 100, other examples may apply to other network environments. Furthermore, other examples may apply to other types of communication networks or sub-networks as well.

The core mobile communication network 105 and the radio access network 110 may be operated by a carrier or service provider to provide a wide range of mobile communication services and ancillary services or features to its subscriber customers and associated device users. The core mobile communication network 105 and the radio access network 110 may be configured to manage data communications that occur in and through a mobile communication network. For example, the core mobile communication network 105 and the radio access network 110 may facilitate communications between one device (e.g., devices 115a to 115d) and another device that may be in communication with a different radio access network or from one device to other systems. Alternatively, the core mobile communication network 105 and the radio access network 110 may facilitate communications between a device and other packet networks 120 (e.g., private intranets of the carrier and/or other third parties) or other destinations outside of the mobile communication network formed by the core mobile communication network 105 and the radio access networks it is in communication with (e.g., radio access network 110). In one example, the core mobile communication network 105 and the radio access network 110 may facilitate communications of one device with a packet switched data communication network, such as the network commonly referred to as the "Internet."

In general, the core mobile communication network 105 and the radio access network 110 offer users of the mobile devices IP packet data transport capabilities for a variety of data services, e.g. via the Internet, such as downloads, uploads, web browsing, email, streaming of digital multimedia content, etc. The radio access network 110 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In a 4G/LTE type implementation, for example, the core mobile communication network 105 may be implemented as an IP Multimedia Subsystem (IMS). For a 2G or 3G mobile network implementation, core network 105 may take the form of a general packet radio service core network (GGSN).

In the example, the core mobile communication network 105 includes, among other things, at least one packet data serving node (PDSN) 125 that acts as a connection point or gateway between the core communication network 105 and one of the radio access networks that it is in communication with. The PDSN 125 establishes, maintains and terminates logical links to the associated portion of the radio access network 110 and provides the packet routing function between the radio access network 110 to/from other packet switched networks, in this case via the IP transport through the core network 105, e.g. for packet based communications with other networks 120. For example, data packets received by the core mobile communication network 105 from outside networks 120 and addressed to a particular mobile device such as 115a may be transmitted by the PDSN 125 to a radio network controller (RNC) 130 in the radio access network 110.

The PDSN 125 (and/or other components of the core mobile communication network 105) may also be configured to monitor the data for each client device that is transmitted to and from the one or more RNCs 130 for use in determining how much data is to be charged to the subscriber associated with the mobile device. Thus, data packets received by the PDSN 125 addressed to or originating from a device such as the mobile device 115a may be counted by the PDSN 125, to record an amount of the data sent for the mobile device 115a through the radio access network 110 for data usage billing purposes. It should be noted that while a single PDSN 125 is illustrated in FIG. 1 for simplicity, the network environment 100 may include any number of PDSNs, for example, to support an expected level of packet data communications of mobile devices through any number of radio access networks providing wireless coverage in various geographic regions of a large service territory. Also, different types of gateway servers may be used for different wireless technologies instead of or in addition to PDSNs. For example, a high availability (HA) server can be used for 3G or a packet data gateway (PGW) server for 4G. Also, the counts are typically collected by the appropriate network nodes but processed through other systems (not shown) for bill processing or account debiting.

The radio access network 110 may include at least one radio network controller (RNC) 130 and a number of base stations represented in the example by the base stations (BSs) 135. Such base stations 135 typically include a base transceiver system (BTS) which communicates via an antennae system at the site of base station and over the airlink with one or more of the wireless devices 115a to 115d when the wireless devices are within range. Each base station 135 typically includes a BTS coupled to several antennae mounted on a radio tower within a coverage area often referred to as a "cell." The BTS is the part of the radio network that sends and receives radio frequency (RF) signals to/from the wireless devices that the base station currently serves. The radio access network 110 also include a traffic network which carries the user communications for the wireless devices 115a to 115d between the respective base stations 135 and other elements with or through which the mobile devices 115a to 115d communicate.

The RNC 130 is configured to communicate with mobile devices using the one or more base stations 135 in the radio access network 110 and provide a link between the mobile devices and the core mobile communication network 105. For example, when the RNC 130 receives data packets addressed to mobile device 115a, the RNC 130 may attempt to establish an active traffic channel with the mobile device 115a. Once the active traffic channel is set up, the RNC 130 can transmit the data packets to the mobile device 115a as well as communicate any data packets received from the mobile device 115a to other destinations using the active traffic channel. The traffic channel may be terminated after an idle period where no communication between the mobile device 115a and the RNC 130 occurs for a defined period of time.

The RNC 130 may also be configured to inform the PDSN 125 of the status of traffic channels with the mobile device 115a. For example, the RNC 130 may transmit a communication to the PDSN 125 that notifies the PDSN 125 that an active traffic channel has been established with the mobile device 115a or that an active traffic channel has been terminated. In some examples, the communication may be a message that is a part of an existing protocol (e.g., an active_start or active_stop message transmitted in 3G protocols) or a message that is not part of an existing protocol.

The mobile devices 115a to 115d that communicate using the core mobile communication network 105 and the radio access network 110 may include any device capable of communicating wirelessly with the radio access network 110. Mobile devices may include computers, laptops, or mobile client devices such as portable handsets, smart-phones, tablet computers, or personal digital assistants (PDAs), although they may be implemented in other form factors, including consumer and business electronic devices. In FIG. 1, for example, mobile devices 115a to 115d may be in the form of a smart-phone or tablet, a portable handset, or a laptop configured to communicate wirelessly with the radio access network 110. Any or all such devices may support voice communications and/or mobile messaging. Of note for purposes of this discussion, the types of device 115a to 115d considered here support packet data communications through the networks 110, 105.

As noted above, for account billing purposes, the PDSN 125 records the amount of data transmitted to an RNC 130 for delivery to a mobile device associated with a user or subscriber, such as mobile device 115a. The user's account may then be billed based on the amount of data recorded. For example, for each data packet transmitted to the mobile device, the PDSN 125 may count the number of bytes in the data packet and add the number of bytes in the data packet to the previous total number of bytes transmitted by the PDSN 125 for delivery to the mobile device 115a. The total number of bytes may be a running total for a specific period of time (e.g., a billing period). The total number of bytes transmitted by the PDSN 125 for delivery to the mobile device 115a may then be transmitted or collected by another system (e.g., a billing system) for bill processing and/or account debiting.

When the RNC 130 receives the data packets for the user from PDSN 125, the RNC 130 may determine whether a traffic channel is already active with the mobile device 115a. If an active traffic channel is established, the RNC 130 may transmit the data packets to the mobile device 115a using the active traffic channel; and the PDSN 125 may subsequently make a record of the amount of data transmitted to the RNC 130 for billing purposes. If there is no active traffic channel, the RNC 130 may attempt to establish one by paging the mobile device 115a. The RNC 130 may page the mobile device 115a by attempting to transmit to the mobile device 115a a communication on a particular channel (e.g., a paging channel in CDMA) that is configured to elicit a response from the mobile device 115a if received by the mobile device 115a. The communication may be transmitted via one or more base stations 135 in communication with the RNC 130 to areas that the mobile device 115a is believed to be based on, for example, its last known location.

Mobile devices that do not have an active traffic channel, such as mobile device 115a, may listen on the particular channel for the messages transmitted by the RNC 130. In some cases, to conserve battery, the mobile device 115a may only listen to the channel at predefined intervals. The mobile device 115a may receive the communication if it is within range of at least one of the base stations 135 in communication with the RNC 130. In response to receiving the communication, the mobile device 115a may be configured to transmit a response to the communication back to the RNC 130 requesting the allocation of a traffic channel. The response may be transmitted on a different channel (e.g., a reverse access channel in CDMA) and be configured to notify the RNC 130 that the mobile device 115a is within range of at least one of the base stations 135 and is capable of receiving the data packets from the RNC 130. If the RNC 130 receives a response, the RNC 130 may assign an active traffic channel to the mobile device 115a by sending information to the mobile device 115a to coordinate traffic channel assignment (e.g., on a forward access channel in CDMA). After the active traffic channel between the RNC 130 and the mobile device 130 is established, the RNC 130 may begin transmitting the data packets to the mobile device 115a via the active traffic channel.

When the mobile device 115a is in communication with the radio access network 110 via the base stations 135, e.g. when the mobile device 115a receives and responds to the page from the RNC 130 or when the device has an active traffic channel already set up through the radio access network 110, the mobile device 115a can be expected to receive all of the data packets recorded and transmitted by the PDSN 125. However, for various reasons, the mobile device 115a may lose communication with the radio access network either before an active traffic channel to transmit the data packets is established or during transmission of the data packets to be delivered to the mobile device 115a. In such situations, data packets recorded by the PDSN 125 for billing purposes may not be received by the mobile device 115a.

Figure 2:
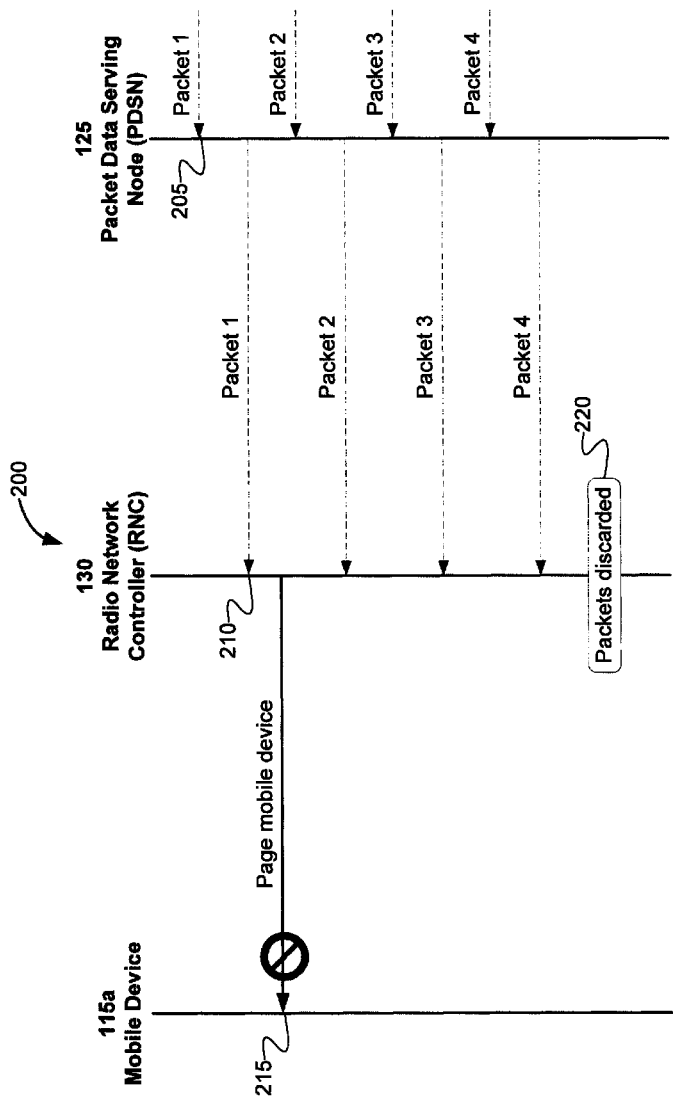
FIG. 2 is a flow diagram illustrating an exemplary scenario in which data packets counted by a packet data serving node (PDSN) for billing purposes may not be received by a mobile device.

FIG. 2 is a flow diagram 200 illustrating an example of a scenario in which data packets recorded by a packet data serving node (PDSN) 125 for billing purposes may not be received by a mobile device. For discussion purposes, we will assume that communications are intended for the mobile device 115a, although similar scenarios could occur with respect to other mobile devices such as devices 115b to 115d. At 205, the PDSN 125 begins receiving data packets (e.g., data packets 1 through 4) addressed to the mobile device 115a. The data packets may be received from a device in another network 120 or from another system in communication with a different radio access network. Once received, at 210, the PDSN 125 identifies an appropriate radio access network 110 and begins transmitting the received data packets to the radio network controller (RNC) 130 for the radio access network 110. In our example, the amount of data in the data packets transmitted to the RNC 130 for delivery to the mobile device 115a through the radio access network 110 is also recorded by the PDSN 125 for data usage billing purposes.

In response to receiving the data packets from the PDSN 125, the RNC 130 may attempt to establish an active traffic channel by first paging the mobile device at 215, for example, when it receives the first packet(s) of a new communication for the device and the device does not currently have an active traffic channel for packet communications set up through the radio access network 110. However, in the example scenario of FIG. 2, the RNC 130 is unable to communicate with the mobile device 115a and set up an active traffic channel. This inability to set up an active traffic channel may occur for various reasons. For example, the mobile device 115a may be out of range of the base stations 135 (e.g., in a tunnel or area without service) or the mobile device 115a may have shut down abnormally (e.g., from the removal of the battery in the mobile device 115a).

If the RNC 130 is not able to transmit the data packets to the mobile device 115a, the RNC 130 may buffer the data packets until the mobile device 115a can be reached. Eventually, however, the buffered data packets may be discarded if communication with the mobile device 115a is not established, for example at 220, if the buffer becomes full or if attempts to reach the mobile device 115a time out (e.g., attempts to page or contact the mobile device 115a does not succeed within a specified time frame). Accordingly, the amount of data in the discarded data packets received by the RNC 130 from the PDSN 125 may be recorded by the PDSN 125 for billing purposes, but are not actually received by the mobile device 115a. For example, in the example scenario illustrated in FIG. 2, the PDSN 125 may record the data in the 4 data packets for billing to the user of the mobile device 115a even though the mobile device 115a did not receive any of the 4 data packets.

In these and other data transmission scenarios, far more data may be billed to the user and not received by the user's mobile device 115a. Even small disparities between the data recorded for billing purposes and the data actually received by the mobile device 115a may add up over a large number of attempted data transmissions. For example, if during an attempted data transmission to a mobile device, such as mobile device 115a, only 500 kilobytes are transmitted from the PDSN 125 to the RNC 130 and recorded for billing to the user. However, as discussed above, these data transmissions may not be received by the mobile device 115a. If similar data transmissions are transmitted to the mobile device 115a several times a day, over the course of the billing period (e.g., a monthly billing period), the data recorded for billing to the user that is not received by the mobile device 115a may add up to a significant portion of the total data recorded for billing to the user. Although some data transmission protocols may use two-way signal exchanges intended to notify a sender device or system that the mobile device 115a is not receiving data packets, parties using the core mobile communication network 105 and the radio access network 110 may not be required to implement these transmission protocols. For example, applications that use a user datagram protocol (UDP), such as streaming video, may not have two-way exchanges of data that will notify the party transmitting the data that the mobile device 115a is no longer reachable.

Figure 3:
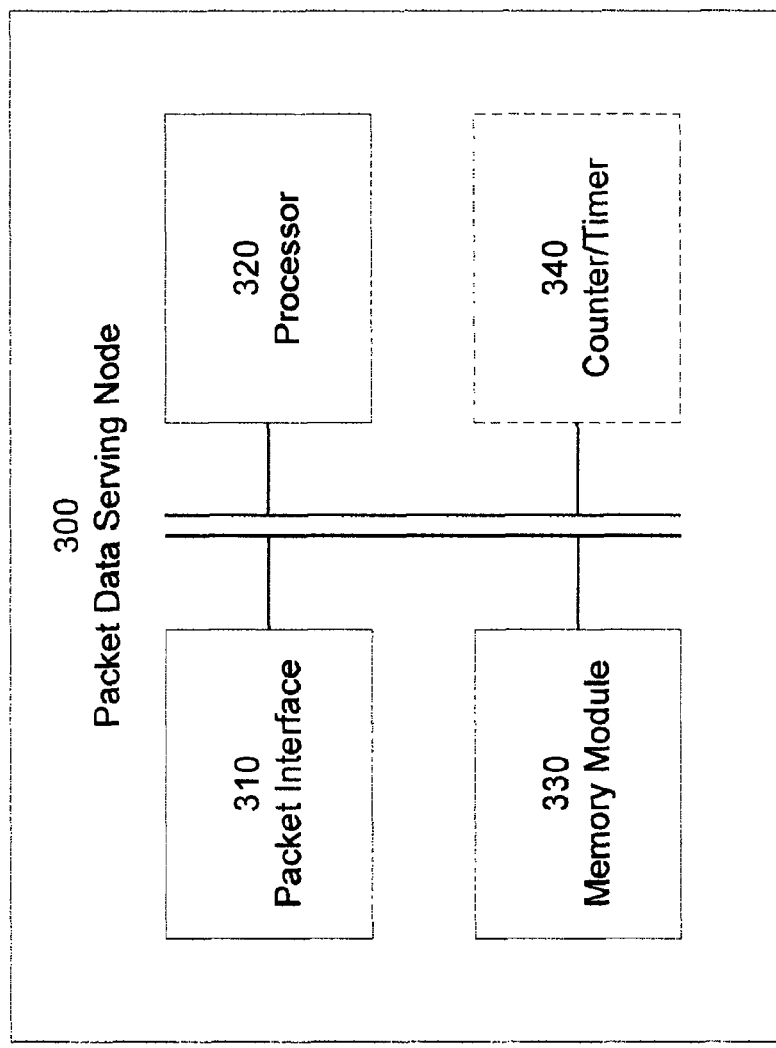
FIG. 3 is a block diagram illustrating an exemplary packet data serving node (PDSN) configured to limit the number of data packets recorded for billing a user that the user may not actually receive.

The various examples described herein provide for a network connected node (e.g. PDSN 125) configured to limit the number of data packets processed so as to record amount of data transmitted for the mobile device, for data usage billing purposes that a user's mobile device may not actually receive. FIG. 3 is a block diagram illustrating an exemplary PDSN 300. The structure and operation of the PDSN 300, as outlined with respect to FIG. 3, is described by way of example, only. More specifically, the PDSN 300 in FIG. 3 is shown as having a packet interface 310, a processor 320, and a memory module 330. In other examples, however, the PDSN 300 may include additional components, fewer components, or different components.

The packet interface 310 is configured to enable the PDSN 300 to communicate with other systems, servers, or networks over a data communication network. For example, the packet interface 310 may receive data packets from other networks 120 addressed to mobile devices in communication with radio access network 110 and forward the data packets to radio network controller (RNC) 130 to be delivered to the mobile devices. The packet interface 310 may also receive data packets originating from the mobile devices from the RNC 130 and forward the data packets to their destinations, possibly in other networks 120. Communications generated by the RNC 130 may also be received by the packet interface 310. For example, the packet interface 310 may receive messages from the RNC 130 that include indications of the status of traffic channels with mobile devices, such as upon initial set up of an active traffic channel (e.g. an active_start message) or that an active traffic channel has been terminated (e.g. active_stop message).

The processor 320 serves as a programmable controller for the PDSN 300 by configuring the PDSN 300 to perform various operations or functions in accordance with instructions or programming executable by the processor 320. Such operations or functions may include various general operations of PDSN 300, operations implemented by execution of various applications that have been installed on the PDSN 300, as well as directing other components of the PDSN 300 such as packet interface 310 and memory module 330. The operations of the PDSN 300 implemented by processor execution of appropriate programming may also include operations related to monitoring data for billing purposes and, in particular, to limiting the number of data packets processed to record transmitted data amounts for data usage billing purposes in a situation where a user's mobile device may not actually receive the packets carrying the data and related operations as described herein.

The amount of data from packets recorded for data usage billing purposes may be limited using a counter, which may be implemented in hardware such as counter 340 in FIG. 3, in software, or in a combination. For example, as will be discussed in more detail below, the processor 320 may initiate a counter that gradually reaches a determined value. The counter may count a variety of different things, such as time, amount of data carried in transmitted packets or number of transmitted packets. Correspondingly, the determined value associated with the counter may be an amount of time (e.g., 10 seconds), an amount of data (e.g., a number of bytes or number of data packets), or another value. Before the counter has reached the determined value, the data packets transmitted from the PDSN 300 to the RNC 130 for delivery to a mobile device may be processed to record data amounts for the purpose of billing the user associated with the mobile device.

When the counter reaches the predetermined value, the processor 320 may determine whether an active traffic channel was set up with the mobile device. If the active traffic channel has been set up before the counter reached the value, the processor 320 may continue to record the data amounts for packets transmitted to the RNC 130 for delivery to the mobile device for the purpose of billing the user associated with the mobile device. If the traffic channel has not been set up, the processor 320 may stop recording the data amounts for packets transmitted to the RNC 130 for delivery to the mobile device for the purpose of billing the user associated with the mobile device. Accordingly, the number of data packets processed for the purposes of billing the user that the user might not actually receive can be limited to the number of data packets transmitted by the PDSN 300 to the RNC 130 for delivery to the mobile device before the counter reaches the predetermined value.

The memory module 330 may include one or more memory devices such as a hard disk drive, a flash memory, or other storage devices. The memory module 330 may be configured to store, for example, programming or instructions such as the PDSN 300 operating system, firmware, and application software configured for execution on the processor 320. The instructions may be configured to enable the PDSN 300 to monitoring data for billing purposes as described herein. The instruction aspects of the technology may be thought of as "products" or "articles of manufacture" typically in the form of executable code or process instructions and/or associated data that is stored on or embodied in a type of machine or processor readable medium.

Figure 4:
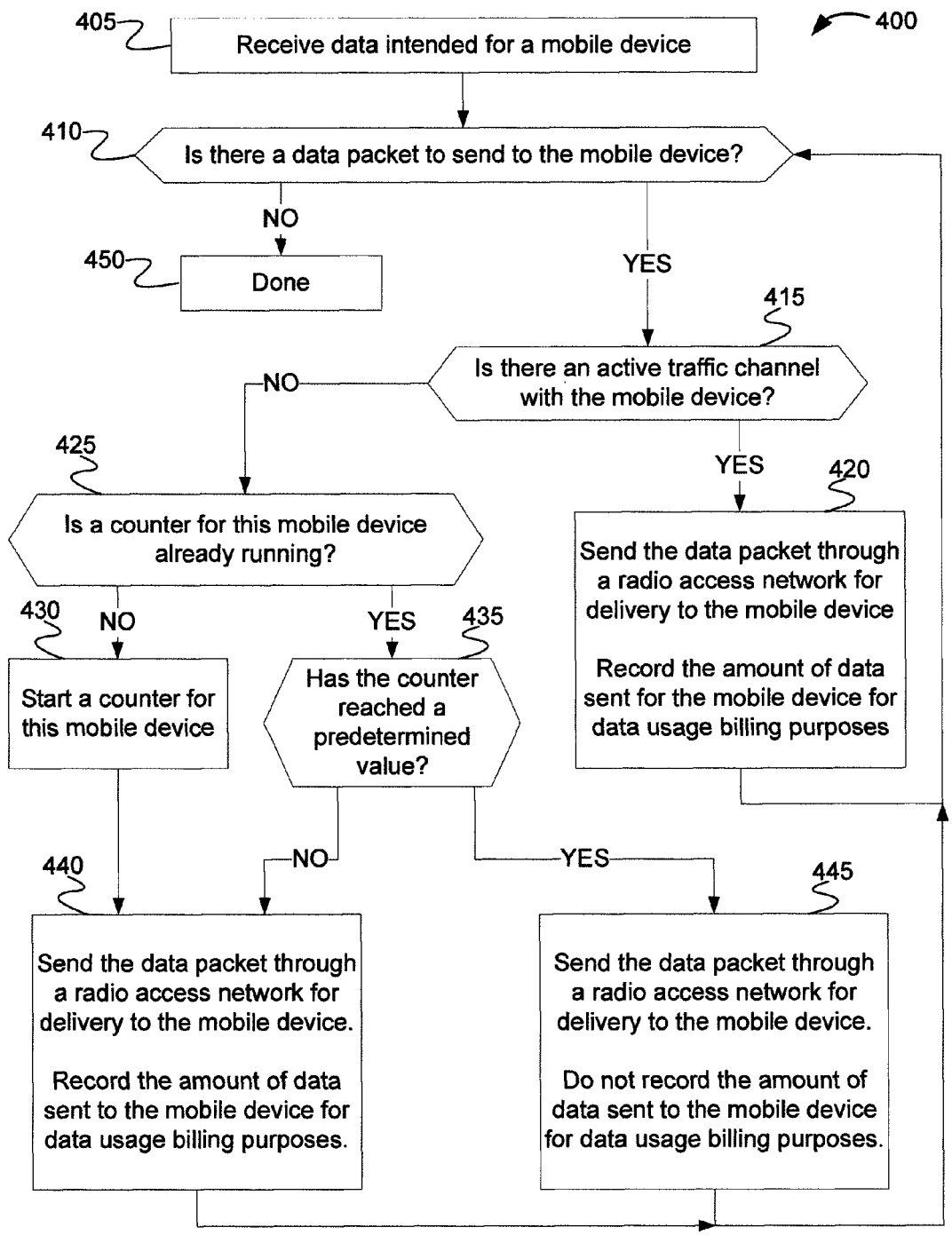
FIG. 4 is a flow diagram illustrating an example of a process for limiting the amount of data recorded for data usage billing purposes.

The execution of the instructions by the processor 320 enables the PDSN 300 to receive data packets from one source and rout the data packets to a destination via the packet interface 310. In some cases, the instructions may also configure the processor 320 to identify a destination mobile device for each of the data packets, identify a user account associated with the destination mobile device, and record the amount of data transmitted to the destination mobile device for the purposes of billing the user account. For example, FIG. 4 is a flow diagram illustrating an example of a process 400 for limiting the amount of data recorded for data usage billing purposes. Although FIG. 4 shows a number of operations that may be performed by the processor 320 executing the instructions stored on memory module 330, other exemplary processes may include additional operations, fewer operations, or substitute operations.

At 405, the packet interface 310 of the packet data serving node (PDSN) 300 may receive data intended for a mobile device such as mobile device 115a in communication with radio access network 110. The data received may be a part of an existing transmission of data or a new transmission of data, e.g. at the start of a new session. Furthermore, the data received may be in the form of data packets that may be transmitted to the mobile device 115a with or without alteration by the PDSN 300. The processor 320, executing the instructions stored on memory module 330, may determine whether there are data packets to be sent to the mobile device at 410.

If there are data packets to be sent, at 415, the processor 320, executing the instructions stored on memory module 330, may determine whether there is an active traffic channel with the mobile device 115a. The presence of an active traffic channel with the mobile device 115a may be determined based on communications from the RNC 130 that indicate that the RNC 130 has established the traffic channel with the mobile device 115*a*. For example, as discussed above, when the RNC 130 has data to send the mobile device 115*a*, the RNC 130 may page the mobile device 115*a*. If the mobile device 115*a* responds to the page, the RNC 130 may establish an active traffic channel with the mobile device 115*a* with which the data may be sent. Once the active traffic channel is established, the RNC 130 may transmit a communication to the PDSN 300 indicating that an active traffic channel has been established. In some examples, the communication may be a message that is a part of an existing protocol (e.g., an active_start message transmitted in 3G protocols) or a message that is not part of an existing protocol. When the active traffic channel is terminated, the RNC 130 may transmit a communication (e.g., an active_stop message transmitted in 3G protocols) to the PDSN 300 indicating that an active traffic channel has been terminated. Accordingly, the presence of an active traffic channel with the mobile device 115*a* may be determined by the processor 320 based on the messages received by the packet interface 310 from the RNC 130, e.g., based on whether the PDSN 300 most recently received an active_start message or an active_stop message with regard to the destination mobile device 115*a*, from the RNC 130.

If an active traffic channel has been established, the mobile device 115*a* may be considered to be able to receive the data sent to the RNC 130 for delivery and the processor 320 may continue to record the data being sent for delivery to the mobile device 115*a* for data usage billing purposes. Accordingly, at 420, the processor 320 may direct the packet interface 310 to send the data packet to the appropriate radio network controller (RNC) 130 of the radio access network 110 for delivery to the mobile device and also record the amount of data sent transmitted to the RNC 130 for data usage billing purposes. On the other hand, if there is no active traffic channel, at 425, processor 320, executing the instructions stored on memory module 330, may determine whether a counter for the mobile device 115*a* is already running.

If there is no counter running for the mobile device, the processor may be configured to start the counter at 430 and direct the packet interface 310 to send the data packet to the appropriate RNC 130 for delivery to the mobile device 115*a* and also to record the amount of data sent to the RNC 130 for data usage billing purposes at 440. The counter may for example, measure an amount of time (e.g., a timer), an amount of data (e.g., a number of bytes or a number of data packets), or some other value. The counter may be implemented in hardware such as counter 340 in FIG. 3, in software, or as a combination. In some cases, when the counter reaches the predetermined value (e.g., 10 seconds), a signal may be transmitted to the processor 320. In other cases, the processor 320 may be configured to intermittently check to see whether the counter has reached the predetermined value. In other cases, the processor 320, executing instructions, may be configured to implement the counting functions of the counter.

In some aspects, the processor 320, executing the instructions stored on the memory module 330, may calculate the predetermined value that the counter is to reach. The predetermined value may be customized based on current network conditions or factors related to the mobile device 115*a*. For example, the predetermined value may be calculated based on the current transmission speeds of the network or the average amount of time that elapses (or the average amount of data transmitted) before an active traffic channel is established. Furthermore, the predetermined value may be calculated based on data for all mobile devices or radio access networks in communication with the PDSN 300, with all mobile devices connected to the radio access network 110 that the destination mobile device 115*a* is in, or for just the mobile device 115*a*. In other aspects, in order to reduce complexity, the predetermined value is a set value that is not calculated dynamically.

On the other hand, if there is a counter already running for the mobile device 115*a*, the processor may determine whether the counter has reached a predetermined value. While the counter has not reached a predetermined value (e.g., an amount of time or amount of data), the processor 320 may record the amount of data being sent to the RNC 130 for delivery to the mobile device for data usage billing purposes. For example, at 435, the processor 320 may determine whether the counter has reached the predetermined value. If the counter has not reached the predetermined value, at 440, the processor 320 may send the data packet through the radio access network for delivery to the mobile device 115*a* and continue to record the amount of data being sent to the RNC 130 for delivery to the mobile device for data usage billing purposes.

If the counter has reached the predetermined value and no active traffic channel with the mobile device 115*a* exists, the mobile device 115*a* may not be able to receive data sent to the RNC 130 for delivery. Accordingly, the processor 320 may stop recording the data being sent for delivery to the mobile device for data usage billing purposes. For example, at 445, the processor 320 may direct the packet interface 310 to send the data packet to the RNC 130 for delivery to the mobile device, but not record the amount of data in the data packet sent to the RNC 130 for data usage billing purposes.

In one example, even though the processor 320 has stopped recording the data being sent for delivery to the mobile device for data usage billing purposes, the processor 320 may continue to send the data to the RNC 130 for delivery. When an active traffic channel is eventually established, the data at the RNC 130 and waiting for delivery may be sent directly from the RNC 130 to the mobile device 115*a* using the active traffic channel. In some cases, an RNC 130 will be configured to page the mobile device 115*a* on a paging channel when data is received for delivery to the mobile device 115*a*. If the mobile device 115*a* does not respond to the page within a predetermined time interval, the RNC 130 may discard the data. If the RNC 130 no longer has data to deliver to the mobile device (e.g., the RNC 130 has discarded all previously received data for deliver to the mobile device), the RNC 130 will stop paging the mobile device 115*a* over the paging channel. However, as long as the PDSN 300 continues to send the data to the RNC 130 for delivery, the RNC 130 will continue to have data to deliver to the mobile device. Accordingly, the PDSN 300 may cause the RNC 130 to continue to page the mobile device 115*a* over the paging channel by continuing to send the RNC 130 data for delivery to the mobile device 115*a* even after the counter has expired and without an existing active traffic channel. The recording of data being sent for data usage billing however may cease until the processor 320 determines that an active traffic channel with the mobile device has been established. For example, the RNC 130 may continue to try to establish an active traffic channel with the mobile device 115*a* in order to deliver the data by paging the mobile device 115*a* and waiting for a response indicating that the mobile device 115*a* is within range of at least one of the base stations 135 and is capable of receiving the data packets from the RNC 130. As described above, the RNC 130 may be configured to page the mobile device 115*a* in an attempt to establish the active traffic channel while the RNC 130 continues to receive data from the PDSN 300 for delivery to the mobile device 115*a*. In other configurations, the RNC 130 may periodically page the mobile device 115*a*. For example, the RNC 130 may use a timer to measure when the next attempt should be made.

If the mobile device 115*a* responds to the paging, the RNC 130 may establish the active traffic channel with the mobile device 115*a* and begin transmitting data to the mobile device 115*a* using the active traffic channel. The RNC 130 may also transmit an active_start message to the packet interface 310 of the PDSN 300. The active_start message informs the processor 320 that the traffic channel has been established with the mobile device 115*a* and, in response to receiving the active_start message, the processor 320 may resume recording the data sent for the mobile device for data usage billing purposes. Further details are discussed below, for example, with respect to FIG. 6.

In another example, if no traffic channel has been established when the counter reaches the predetermined value, the processor 320 may stop sending the data to the RNC 130 for delivery to the mobile device 115*a*. The processor 320 may stop sending the data to the RNC 130 for delivery to the mobile device until an active traffic channel is established for the mobile device 115*a*. For example, the data already sent by the PDSN 300 to the RNC 130 may be temporarily stored in a buffer at the RNC 130 until the buffer becomes full, until the time the data is stored in the buffer exceeds a threshold time limit, or until a traffic channel is set up with the mobile device 115*a* and the data can be transmitted to the mobile device 115*a*. While the data is stored in the buffer, the RNC 130 may continue to attempt to establish traffic channel with the mobile device 115*a*. If an active traffic channel is established between the RNC 130 and the mobile device 115*a*, the RNC 130 may transmit an active_start message that is received by the packet interface 310 of the PDSN 300. In response to receiving the active_start message, the processor 320 may resume transmitting data to the RNC 130 for delivery to the mobile device 115*a* as well as resume recording the data sent for the mobile device for data usage billing purposes.

In another example, if no traffic channel has been established when the counter reaches the predetermined value, the PDSN 300 may attempt to notify the sender of the data (e.g., the originator of the data packets) that the mobile device is unable to receive the data by generating and sending a stop message to the sender. For example, the processor 320 can generate a message configured to inform the sender that no traffic channel has been established as of yet. The message may be transmitted, via the packet interface 310, to the sender. In some examples, in response to receiving the message, the sender can stop transmitting the data to the sender or send the data to the mobile device 115*a* using other means or networks. If and when the traffic channel has been established with the mobile device 115*a*, the processor 320 may generate and transmit, via the packet interface 310, a message to the sender informing the sender that the traffic channel has been established. The sender may then resume transmitting the data to the mobile device 115*a* using the mobile communication network of the PDSN 300.

Referring back to FIG. 4, after the data packet is processed, the process may return to 410, where the processor 320 determines whether there are any additional data packets to be sent to the mobile device 115*a*. If there are additional data packets, for each data packet, the process may proceed to 415 where the processor 320 determines whether there is an active traffic channel for the mobile device and continue with the process as described above. On the other hand, if there are no more data packets to send to the mobile device, at 450, the process may terminate.

In some scenarios, a mobile device such as mobile device 115*a* may lose contact with the mobile communication network and, as a result, the active traffic channel may be lost. These scenarios may also be addressed by the process 400. For example, for one data packet, there may be an active traffic channel at 415. As a result, the process may proceed to 420, where the data may be sent through the radio access network for delivery to the mobile device 115*a* and the amount of data sent may be recorded for data usage billing purposes. When the next data packet is processed, however, the traffic channel may be lost. Accordingly, at 415, the processor 320 may determine that there is no active traffic channel and proceed with the process 400 at 425.

In some cases, the PDSN 300 may receive data from different sources. In one example, the PDSN 300 may treat all data packets received that are directed to a particular mobile device, such as mobile device 115*a*, the same, regardless of the source of the data packets. However, in the example above, where the PDSN 300 is configured to notify senders of the data packets that the mobile device 115*a* is not able to receive data packets, the PDSN 300 may send each source of the data packets a message that notifies the source that the mobile device 115*a* is unable to receive the data.

Figure 5:
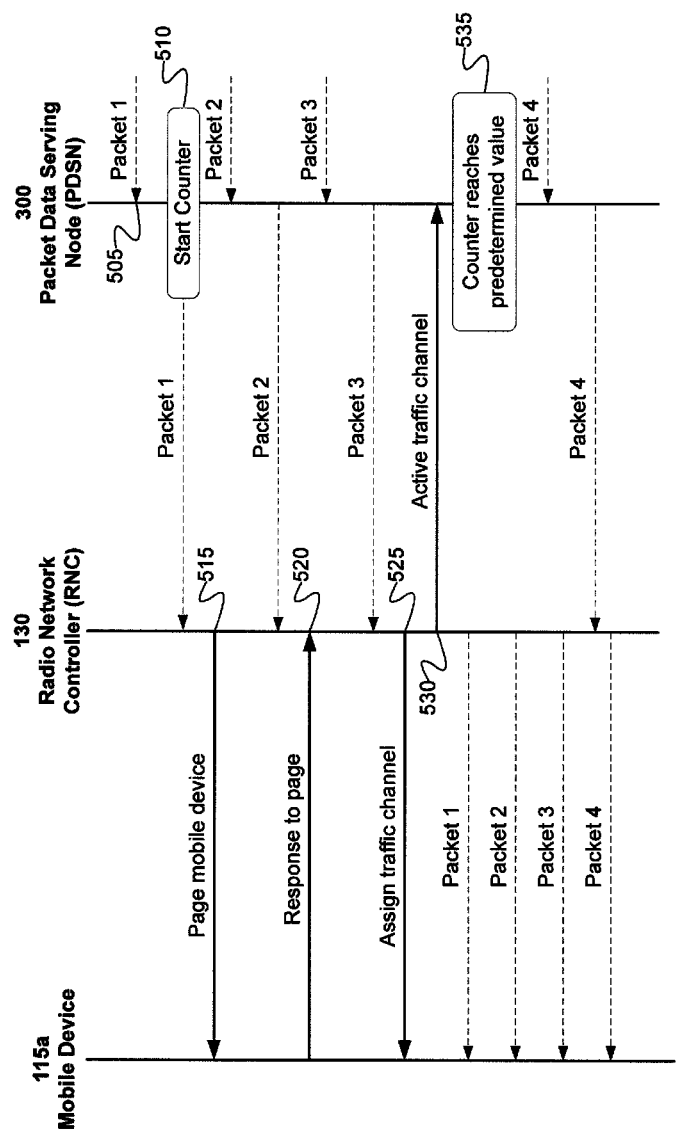
FIG. 5 is a data flow diagram illustrating an example of a scenario in which a PDSN records data transmitted for delivery to a mobile device.
Figure 6:
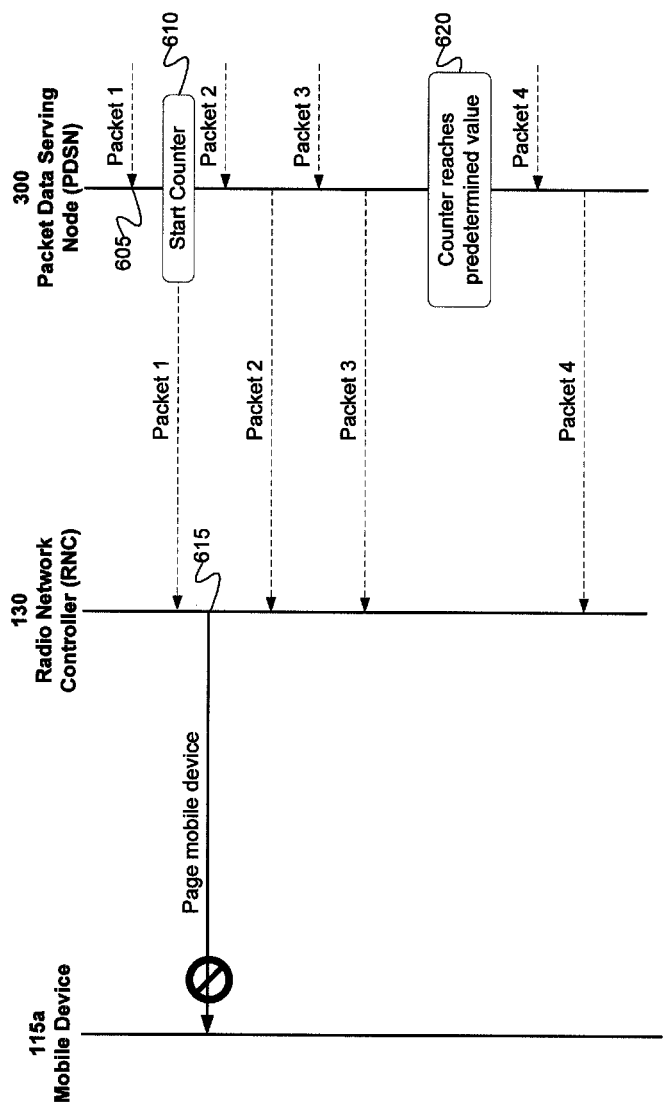
FIG. 6 is a data flow diagram illustrating another example of a scenario in which a PDSN records data transmitted for delivery to a mobile device.

Further aspects of the process 400 for limiting the amount of data recorded for data usage billing purposes may be further illustrated with respect to FIG. 5 and FIG. 6.

FIG. 5 and FIG. 6 are two data flow diagrams illustrating example scenarios in which a packet data serving node (PDSN) records data transmitted for delivery to a mobile device. At 505 in FIG. 5, the packet interface 310 of PDSN 300 may begin receiving data packets (e.g., data packets 1 through 4) addressed to the mobile device 115*a*. The data packets may be received from a device in another network 120 or from another system in communication with a different radio access network.

For each data packet to be transmitted to RNC 130 for delivery to the mobile device 115*a*, the processor 320, executing instructions on the memory module 330, may determine whether there is an active traffic channel with the mobile device 115*a*. For example, for Packet 1 in FIG. 5, the processor 320 may determine that there is no active traffic channel that is set up with the mobile device 115*a* and no counter running for the mobile device 115*a*. Accordingly, at 510, the processor 320 may start a counter and direct the packet interface 310 to send Packet 1 through to the radio network controller (RNC) 130 of the appropriate radio access network 110 for delivery to the mobile device 115*a*. Once the data is received at the RNC 130, the RNC 130 may page the mobile device 115*a* at 515. If the mobile device 115*a* provides a response to the RNC 130, as illustrated at 520 in the scenario of FIG. 5, the RNC 130 may assign a traffic channel to the mobile device 115*a* at 525. The RNC 130 may then transmit a message reporting the active traffic channel that has been set up with the mobile device 115*a* to the PDSN 300 at 530. The RNC 130 may also begin delivering the data, via the active traffic channel, to the mobile device 115*a*.

During this time, the processor 320, executing instructions on the memory module 330, continues to receive data packets (e.g., Packets 2, 3, and 4) addressed to the mobile device 115*a*. For Packets 2 and 3, the processor 320 determines that there is no active traffic channel, that there is already a counter running for the mobile device, and the counter has not yet reached the predetermined value. Accordingly, the processor 320 will forward Packets 2 and 3 to the RNC 130 via the packet interface 310 and to record the amount of data forwarded to the RNC 130 for delivery to the mobile device 115*a* for data usage billing purposes.

At 535, the counter reaches the predetermined value. For Packet 4, the processor 320 may determine that an active traffic channel with the mobile device 115a has been established based on the message received by the packet interface 310 from the RNC 130 reporting the active traffic channel. Accordingly, the processor 320 may continue to transmit Packet 4 to the RNC 130 and record the amount of data forwarded to the RNC 130 for delivery to the mobile device 115a for data usage billing purposes.

In the scenario illustrated in FIG. 5, the mobile device 115a was in communication with the radio access network 110 and, therefore, was able to receive the data packets transmitted by the PDSN 300. Furthermore, because the PDSN 300 received an indication that an active traffic channel with the mobile device 115a existed before the counter reached the predetermined value, the PDSN 300 was able to record all of the data transmitted to the RNC 130 for delivery to the mobile device 115a. However, if an active traffic channel with the mobile device 115a was unable to be established and the mobile device 115a was unable to receive data, the operations of the PDSN 300 would be able to limit the data recorded for data usage billing purposes to the data transmitted before the counter reached the predetermined value. Limiting the data recorded for data usage billing purposes may provide a more accurate view of data actually consumed by the mobile device 115a when the mobile device 115a is unable to receive data from the radio access network 110.

The scenario in FIG. 6 helps to illustrate this concept. At 605, the packet interface 310 of PDSN 300 may begin receiving data packets (e.g., data packets 1 through 4) addressed to the mobile device 115a. In response to receiving the data packets, the processor 320, executing instructions on the memory module 330, may determine that there is no active traffic channel that is set up with the user. Accordingly the processor 320 may start a counter at 610 and direct the packet interface 310 to begin sending the received data through to the radio access network 110 via the RNC 130 for delivery to the mobile device 115a.

Once the data starts being received at the RNC 130, the RNC 130 may page the mobile device 115a at 615. In the scenario of FIG. 6, the mobile device 115a is not in communication with the RNC 130 and, as a result, is unable to respond to the page or establish a traffic channel with the RNC 130. Accordingly, the data received by the RNC 130 may be temporarily stored in a buffer until the buffer becomes full or the time the data is stored in the buffer exceeds a threshold time limit, in which case the data may be discarded without being delivered to the mobile device 115a. Alternatively, the data received by the RNC 130 may be temporarily stored in the buffer until communication is reestablished with the mobile device 115a, a traffic channel is set up, and the data can be transmitted to the mobile device 115a.

In the example in FIG. 6, however, the counter reaches a predetermined value at 620. The processor 320 may determine that no active traffic channel with the mobile device 115a has been established because no message from the RNC 130 reporting the active traffic channel was received by the packet interface 310. Accordingly, the processor 320 may continue to forward data to the RNC 130 for delivery to the mobile device 115a but stop recording the forwarded data for data usage billing purposes until a message from the RNC 130 indicates that the traffic channel with the mobile device 115 has been established.

In the scenario illustrated in FIG. 6, the mobile device 115a was not in communication with the radio access network 110 and, therefore, was unable to receive the data packets transmitted by the PDSN 300. The operations of the PDSN 300 limit the data recorded for data usage billing purposes by stopping the recording of data forwarded to the RNC 130 for delivery to the mobile device 130 after the counter reaches the predetermined value and when no active traffic channel has been set up for the mobile device. For example, in the scenario illustrated in FIG. 6, the amount of data in 3 data packets (e.g., Packet 1 to 3) may be recorded for billing purposes because they were transmitted to the RNC 130 before the counter reached the predetermined value. However amount of data in data packets that were transmitted after the counter reached the predetermined value (e.g., Packet 4 and any data packets transmitted after) will not be counted. In certain cases, such as when transmitting large files, streaming multimedia content, or misbehaving applications, the amount of data transmitted by the PDSN 300 and not received by the mobile device 115a may be quite large.

According to another example, the processor 320 of the PDSN 300 may also keep track of the amount of data that was transmitted to the RNC 130 for delivery to the mobile device but not recorded for data usage billing purposes. The amount of data transmitted to the RNC 130 for delivery to the mobile device but not recorded for billing purposes may be collected and processed through another system that can generate a report or communication that may be provided to the user to notify the user of the amount of data transmitted, but not billed to the user. Additionally, the system may also calculate the cost saved by not charging the data transmitted to the RNC 130 and include the cost savings in the report provided to the user. The report may be generated at the request of the user or periodically (e.g., for every billing period) and included in the data usage bill provided to the user. In another example, the amount of data transmitted to the RNC 130 for delivery to the mobile device, but not recorded for data usage billing purposes, may be provided to the network operator or carrier for monitoring network performance, determining where network coverage needs improvement, or other information gathering purposes.

FIGS. 7 and 8 provide functional illustrations of general purpose computer hardware platforms. FIG. 7 is a block diagram illustrating a network or host computer, as may typically be used to implement a server, a controller, or a node. FIG. 8 is a block diagram illustrating a computer with user interface elements. In particular, FIG. 8 depicts a device with user interface elements, as may be used to implement a computer, a mobile device, or any other computing device. FIG. 8 can also be used to implement a mobile device, such as a portable handset, a smart-phone, tablet computer, a personal digital assistant or other type of mobile station or mobile terminal device (e.g., devices 115a to 115d of FIG. 1). A device like that of FIG. 8 may also act as a server, a controller, or a node if appropriately programmed. It is believed that the general structure and general operation of such equipment as shown in FIGS. 7 and 8 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, one or more such computer hardware platforms would run server programming, for example, to route data to their destination, function as a gateway, or record data for data usage billing purposes.

The server software functionalities involve programming, including executable code and possibly associated stored multimedia content data. The software code is executable by the central processing unit or other processor of the computer configured as the particular server. In operation, the code is stored within the server computer device. At other times, however, the software may be stored at other locations and/or transported for loading into the appropriate server computer or system. Execution of such code by a processor of the server computer enables the server to perform functions of to route data to their destination, function as a gateway, or record data for data usage billing purposes in essentially the manner performed in the implementations discussed and illustrated herein.

A user terminal such as a general-purpose personal computer or a mobile device typically includes a central processor or other processing device, an internal communication bus, various types of memory or storage multimedia (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to establish an active traffic channel and communicate using the active traffic channel. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to establish an active traffic channel and communicate using the active traffic channel, in essentially the manner performed in the implementations discussed and illustrated herein.

Hence, aspects of the methods of limiting the amount of data that subscribers are charged for that they may not actually receive are provided herein. This may decrease the discrepancy between the amount of data to charged to a subscriber and the amount of data actually received by the subscriber in a mobile communication network. Program aspects of the technology may be thought of as "products" or "articles of manufacture" typically in the form of executable code and/or associated data that is carried on or embodied in a type of non-transitory machine readable medium or in other media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:

receiving, at a node coupled to a radio access network when there is data to send to the mobile device, data intended for a mobile device;

starting a counter in response to receiving the data intended for the mobile device;

sending the data from the node through the radio access network for delivery to the mobile device;

recording an amount of the data sent from the node for the mobile device through the radio access network for data usage billing purposes while running the counter, until the counter reaches a predetermined value;

when the counter reaches the predetermined value, determining whether an active traffic channel through the radio access network has been set up:

in response to determining that an active traffic channel through the radio access network to the mobile device has not been set up, stopping recording of the amount of the data sent for the mobile device through the radio access network for data usage billing purposes, and continue to send the data through the radio access network for delivery without recording the data sent to the radio access network for data usage billing purposes; and in response to determining that an active traffic channel through the radio access network to the mobile device has been set up, continuing recording of the amount of the data sent for the mobile device through the radio access network for data usage billing purposes.

2. The method of claim 1, further comprising stopping the sending of data from the node through the radio access network for delivery to the mobile device after the counter reaches the predetermined value without the active traffic channel having been set up for the mobile device through the radio access network.

3. The method of claim 1, further comprising continuing to send data from the node through the radio access network for delivery to the mobile device after the counter reaches the predetermined value without the active traffic channel having been set up for the mobile device through the radio access network, without recording amount of data sent from the node for delivery to the mobile device after the counter reaches the predetermined value without the active traffic channel having been set up for the mobile device through the radio access network.

4. The method of claim 3, further comprising:
subsequent to stopping the recording of the amount of data sent for the mobile device through the radio access network for data usage billing purposes, receiving a message indicating that the active traffic channel for the mobile device has been set up; and
resuming the recording of the amount of data continuing to be sent from the node through the radio access network for delivery to the mobile device for data usage billing purposes in response to the message.

5. The method of claim 1, wherein the counter and the predetermined value define a time period since an initial transmission of the data from the node through the radio access network for delivery to the mobile device, at a time when there is no active traffic channel set up for the mobile device.

6. The method of claim 1, wherein the counter and the predetermined value define an accumulated amount of billable data sent since an initial transmission of the data from the node through the radio access network for delivery to the mobile device, at a time when there is no active traffic channel set up for the mobile device.

7. The method of claim 1, wherein sending data from the node through the radio access network for delivery to the mobile device comprises sending the data to a radio network controller for the radio access network.

8. The method of claim 7, further comprising, in response to the counter reaching the predetermined value, determining whether the active traffic channel is set up based on a message from the radio network controller indicating that the active traffic channel has been set up.

9. The method of claim 7, further comprising:
terminating the transmission of data to the radio network controller in response to determining that an active traffic channel through the radio access network to the mobile device has not been set up;
buffering, by the radio network controller, the transmitted data; and
transmitting, by the radio network controller, the buffered data in response to determining that an active traffic channel through the radio access network to the mobile device has been set up.

10. A system, comprising:
a packet interface configured to send and receive data packets through a radio access control network;
a processor coupled to the packet interface, the processor being configured to control operations of the system to perform functions, including functions to:
start a counter in response to receiving data intended for the mobile device;
send the data through the radio access network for delivery to the mobile device;
record an amount of the data sent for the mobile device through the radio access network for data usage billing purposes;
stop recording of the amount of the data sent for the mobile device through the radio access network for data usage billing purposes in response to the counter reaching a predetermined value without an active traffic channel having been set up for the mobile device through the radio access network regardless of whether thereafter data continues to be sent through the radio access network for delivery to the mobile device; and
keeping track of and generating a report of the amount of the data sent for the mobile device through the radio access network but not recorded for billing purposes.

11. The system of claim 10, further comprising the counter configured to define a time period since the starting of the counter that no active traffic channel has been established through the radio access network for the mobile device, at a time when there is no active traffic channel set up for the mobile device.

12. The system of claim 10, further comprising the counter configured to define an accumulated amount of billable data sent since the starting of the counter that no active traffic channel has been established through the radio access network for the mobile device, at a time when there is no active traffic channel set up for the mobile device.

13. The system of claim 10, wherein the functions include functions to continue to record the amount of data sent for the mobile device through the radio access network for data usage billing purposes in response to the counter reaching a predetermined value and an active traffic channel having been set up for the mobile device through the radio access network.

14. The system of claim 10, wherein the functions include functions to continue to send data from the node through the radio access network for delivery to the mobile device after the counter reaches the predetermined value without an active traffic channel having been set up for the mobile device through the radio access network, without recording amount of data sent from the node for delivery to the mobile device after the counter reaches the predetermined value without active traffic channel having been set up for the mobile device through the radio access network.

15. The system of claim 14, wherein the functions include functions to resume, subsequent to stopping the recording of the amount of data sent for the mobile device through the radio access network for data usage billing purposes, the recording of the amount of data continuing to be being sent for the mobile device through the radio access network for data usage billing purposes in response to receiving a message indicating that the active traffic channel for the mobile device has been set up.

16. A system, comprising:
a packet interface configured to send and receiving data packets through a radio access control network;
a processor coupled to the packet interface, the processor being configured to control operations of the system to perform functions, including functions to:
determine whether an active traffic channel through the radio access network has been set up;
when there is data to send to a mobile device and it is determined that there is an active traffic channel set up through the radio access network for the mobile device, send the data to the radio access network for delivery and count the data sent to the radio access network for data usage billing purposes;
when there is data to send to the mobile device and it is determined that there is no active traffic channel set up through the radio access network for the mobile device, send the data to the radio access network for delivery and count the data sent to the radio access network for data usage billing purposes and run a timer;
in the event it is determined that an active traffic channel has been established through the radio access network for the mobile device before a predetermined period for the timer expires, continue to send the data through the radio access network for delivery and count the data sent to the radio access network for data usage billing purposes; and
in the event the predetermined period for the timer expires without it being determined that an active traffic channel has been established through the radio access network for the mobile device, continue to send the data through the radio access network for delivery but stop counting of the data sent to the radio access network for data usage billing purposes.

17. The system of claim 16, further comprising the timer configured to define a time period since the starting of the timer that no active traffic channel has been established through the radio access network for the mobile device.

18. The system of claim 16, wherein the functions include functions to, subsequent to stopping the counting of the data continuing to be sent to the radio access network for data usage billing purposes, resume the counting of the data continuing to be sent to the radio access network for data usage billing purposes in response to receiving a message indicating that the active traffic channel for the mobile device has been set up.

19. The system of claim 18, wherein the function to send the data to the radio access network for delivery to the mobile device comprises directing the packet interface to send the data to a radio network controller for the radio access network.

20. The system of claim 19, wherein the message indicating that the active traffic channel for the mobile device has been set up is received by the packet interface from the radio network controller.

* * * * *